(12) United States Patent
Dantas (10) Patent No.: US 6,340,057 B1
(45) Date of Patent: Jan. 22, 2002

(54) CONNECTION DEVICE

(75) Inventor: Sergio Augusto Ferreira Dantas, Rio de Janeiro (BR)

(73) Assignee: FMC do Brasil Industria E. Comercio S.A., Rio de Janeiro (BR)

( * ) Notice: Subject to any disclaimer, the term of this patent is extended or adjusted under 35 U.S.C. 154(b) by 0 days.

(21) Appl. No.: 09/463,910

(22) PCT Filed: May 13, 1998

(86) PCT No.: PCT/BR98/00023

§ 371 Date: Mar. 10, 2000

§ 102(e) Date: Mar. 10, 2000

(87) PCT Pub. No.: WO98/51903

PCT Pub. Date: Nov. 19, 1998

(30) Foreign Application Priority Data

May 14, 1997 (BR) .............................................. 9703159

(51) Int. Cl.[7] .................................................. F16L 1/04
(52) U.S. Cl. ....................... 166/337; 405/158; 405/170; 285/18
(58) Field of Search .......................... 166/337; 405/158, 405/173, 169, 170, 224; 285/119, 18

(56) References Cited

U.S. PATENT DOCUMENTS

| 4,277,202 A | * | 7/1981 | Archambaud et al. ...... 405/169 |
| 4,367,980 A | | 1/1983 | Ames et al. ................. 405/169 |
| 4,452,312 A | | 6/1984 | Roblin ........................ 166/339 |
| 4,477,205 A | * | 10/1984 | Morrill et al. ............... 405/169 |
| 4,842,075 A | * | 6/1989 | Kalvenes et al. ........... 166/341 |
| 6,004,072 A | * | 12/1999 | Cunningham ............... 405/170 |

FOREIGN PATENT DOCUMENTS

| EP | 0 026 353 | 4/1981 |
| EP | 0 059 376 | 9/1982 |

* cited by examiner

*Primary Examiner*—William Neuder
(74) *Attorney, Agent, or Firm*—Smith, Gambrell & Russell LLP (57) ABSTRACT

The present invention refers to a connection device (14, 15), particularly for the connection of a rigid duct to a flexible duct in a submarine system for petroleum exploration, comprising a base (16); a hub fixed on the base; a hoisting/launching device, and a tube (20) with its first end connected to the hub and its second end being free, the novelty basically consisting in that the hoisting/lauching device (22) is placed above the center of gravity of the connection device (14, 15) and the second end (21) of the tube (20) is movable.

13 Claims, 9 Drawing Sheets

SECTION A - A    FIG. 8

DETAIL B    FIG. 9

CONNECTION DEVICE

The present invention refers to a connection device, particularly for connecting a flexible duct to a rigid duct, which is designed to be applied in a submarine system for petroleum exploration.

PRIOR ART

Figure 1:
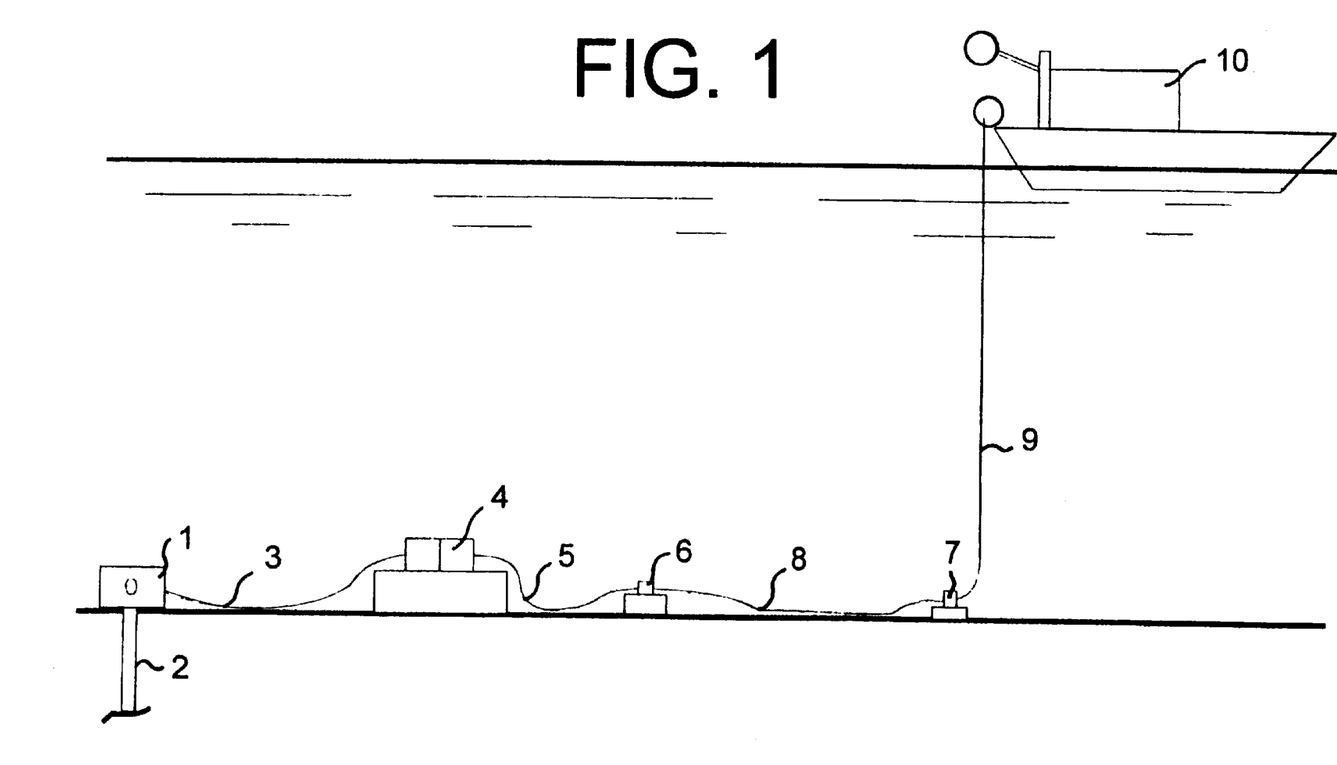
FIG. 1 is a schematic view of a submarine system for petroleum exploration according to the prior art.

Connection devices as described above, also called "plem", are already known. FIG. 1 shows schematically a system for extracting petroleum out of the bottom of the sea, with a Christmas tree 1 arranged on top of an oil well 2; a flexible duct 3 joining the Christmas tree to the manifold 4, and the latter being joined by means of a flexible tube 5 to a connection device 6, which in turn is connected to another connection device 7 by means of a rigid duct 8. The connection device 7 is connected by means of a flexible duct 9 to either a ship or a production platform 10, where petroleum is stored.

Figure 2:
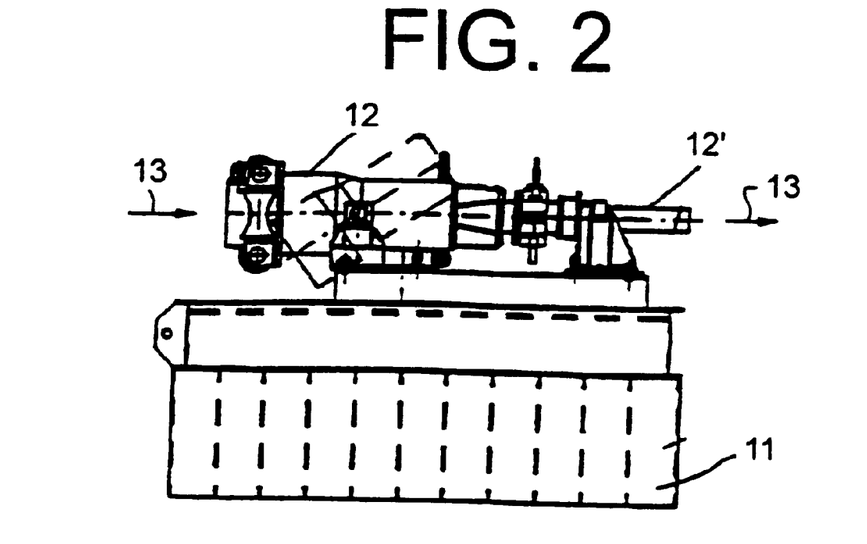
FIG. 2 is a side view of a connection device or plem according to the prior art.
Figure 3:
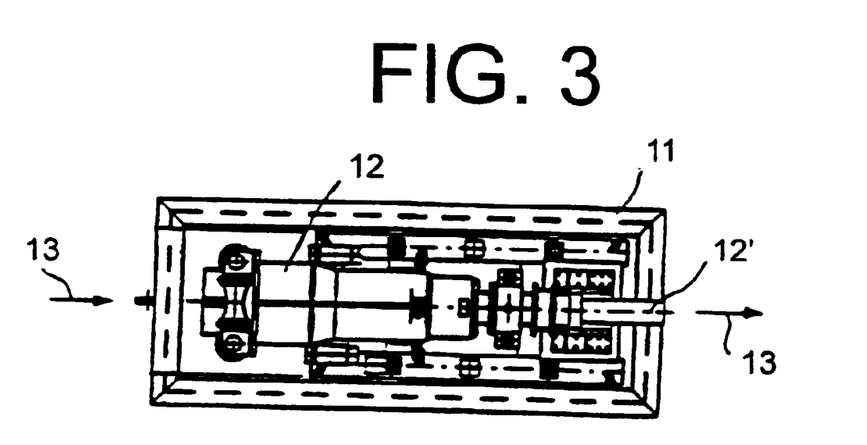
FIG. 3 is a top view of the device of FIG. 2.

FIGS. 2 and 3 show, respectively, a side view and a top view of said connection devices 6 and 7 according to the prior art. These devices basically consist of a base 11, a hub 12 arranged horizontally, and a tube 12' connected to the hub. At the free end of the hub 12 a flexible duct (5 or 9) is coupled, and the rigid duct 8 is connected to the tube 12'; the arrow 13 indicates the direction of petroleum flow.

DRAWABACKS OF THE PRIOR ART

A first drawback of the prior art consists in the following fact; as it is widely known, a rigid duct presents a much lower cost than that of a flexible duct. Thus, whenever possible, the installation of rigid ducts is preferred. According to the rules, the rigid duct 8 shown in FIG. 1 is constituted by joining various segments of tube welded to each other, which have a diameter of, for instance, 16", 12" or 10". Each segment is 900 meters long and is made by welding 75 stretches of tubes, each of them measuring 12 meters. Thus, the service ship unloads onto the bottom of the sea the various segments of rigid ducts, which are joined later by submarine welding. After the connection of the rigid duct 8 on the bottom of the sea, its ends are hoisted and, on board of the service ship, the respective connection devices 8 and 7 are connected. Then a steel rope is tied to the eyelet hole designed for hoisting/launching the connection device, and the duct is launched again (an end at a time) onto the bottom of the sea.

However, the rigid duct often presents a residual torsion during its descent to be laid onto the bottom of the sea again. This torsion also causes a torsion on the connection device 6 or 7, which, at the end of the descent, lies on the bottom of the sea in an incorrect position, which renders substantially difficult the installation of the flexible ducts 5 and 9 and of the umbilical connections (details later and not shown in the figure) for command of the line. Frequently there are also cases in which, due to a very incorrect final position of the connection device, it is not possible to install the flexible ducts 5 and 9, and so one has to hoist each end of the rigid duct 8 with the respective connection device and to launch it into the sea again. Sometimes, various hoistings are required before the satisfactory position of the connection devices is achieved, which makes the installation of the system substantially expensive.

Another drawback of the prior art consists in that, in order to connect the ends of the flexible ducts to the respective connection devices 6 and 7, more than one hydraulic tools are required at different steps and, consequently, more than one maneuver with the service ship, which makes the operation of installing the extraction system extremely expensive and complicated.

There is a third drawback, which is detailed below. The ducts 5 and 9 are accompanied by electric cables and small hydraulic command tubes or umbilicals (not shown), which serve to command remotely, from the ship or production platform, the operations of the petroleum extraction system. This assembly formed by the duct, electric cables and hydraulic tubes is called line. However, during the connection of the lines 5 and 9 to the respective connection devices or plems 6 and 7, damage to the electric pins often occurs before they fit into the respective sockets. The same problem occurs with the hydraulic command tubes, the prominent ends of which are even more liable to be damaged than the electric pins. These problems occur mainly because the hub 12 is horizontally arranged, which renders the fitting of the elements difficult.

OBJECT OF THE INVENTION

The objective of the present invention is to provide a connection device or plem which avoids the drawbacks above and reduces both the costs of installing the extraction system and the time of maneuver of the service ship and hydraulic tools.

This objective is achieved by the fact that the connection device comprises a base; a hub fixed onto the base; a hoisting/launching device, and a tube with the first end connected to the hub and the second end being free, the hoisting/launching device being placed above the center of gravity of the connection device and the second end of the tube is movable.

The end of the tube is rotatable and longitudinally displaceable with respect to the body of the connection device, and the hoisting/launching device may be, for instance, an eyehole.

The hub may be arranged either vertically or horizontally on the base, which is constituted by a central structure and two side structures, one on each side of the central structure, the side structures being turnable.

The movable end of the tube is lockable after the laying of the connection device onto the bottom of the sea by means of hydraulic oil applied under pressure in hydraulic command tubes.

ADVANTAGES OF THE INVENTION

In this way, in the connection device of the invention the hoisting/launching eyehole is above the center of gravity and the end of the tube to which the rigid duct is joined is rotatable. These characteristics enable said device to maintain its position during the descent to the bottom of the sea, thus compensating for the residual torsion of the rigid duct. This provides the great advantage that the connection device will always present a correct final positioning on the bottom of the sea, which prevents the drawbacks of hoisting and relaunching, as cited with respect to the prior art. This fact implies a substantial reduction in the costs of installing the system.

Another advantage of the invention consists in that, when the hub of the connection device is placed in the vertical position, the engagement of the flexible ducts, electric cables and hydraulic command tubes (umbilicals) which make up the line is effected much more simply and quickly. The installation of these lines is carried out with the aid of the vertical connection module (MCV), which is the object of other patent application, the applicant of which is also CBV Indústria Meânica S.A.

The invention will now be described in greater detail, by way of example, with reference to the accompanying drawings, in which.

Figure 4:
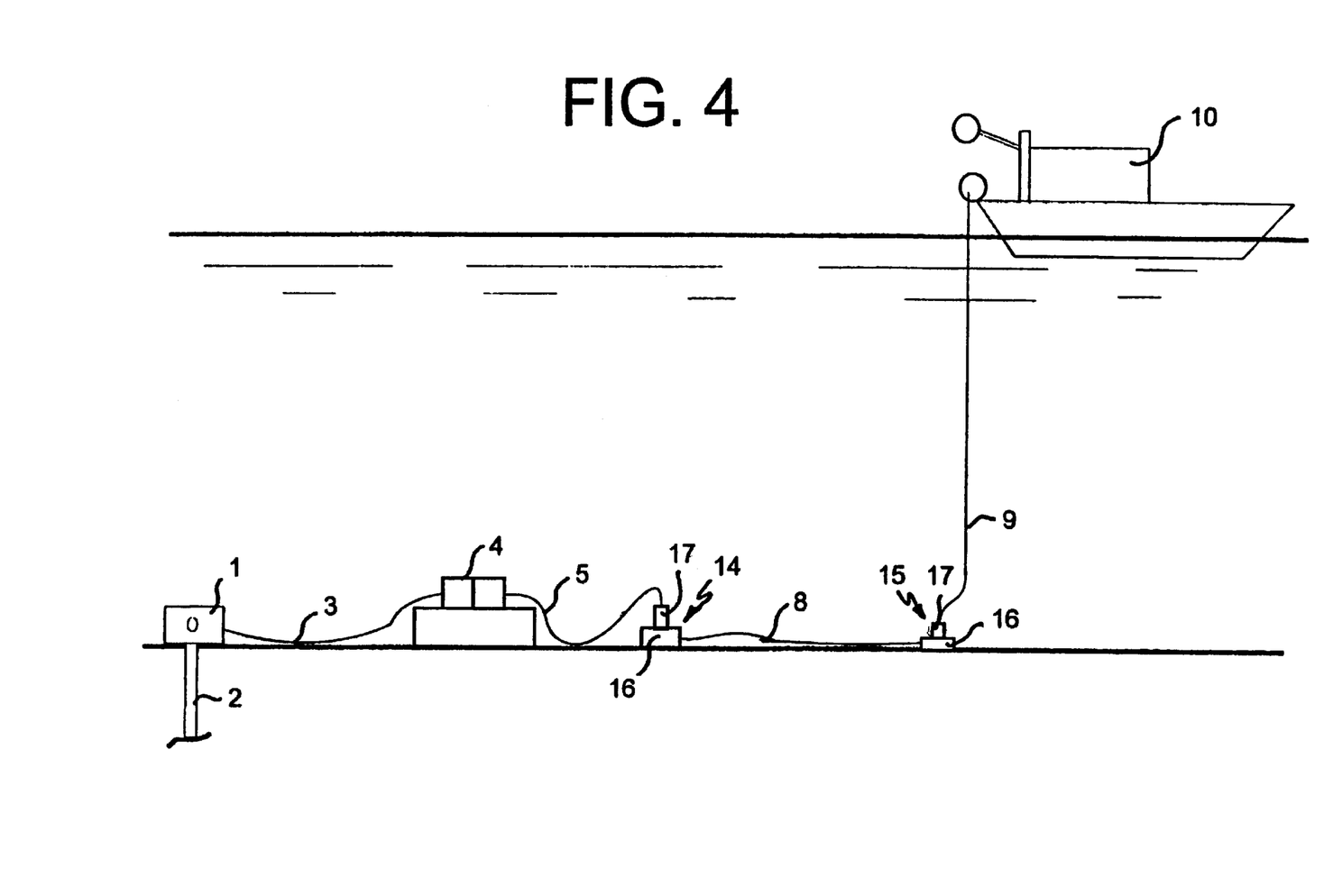
FIG. 4 is a schematic view of a submarine system for petroleum exploration, using the connection device of the invention.

FIG. 4 shows a schematic view of a submarine system for petroleum exploration, using the connection devices 14 and 15 according to the invention, which are basically constituted by a base 16 and a vertical hub 17. It can be seen in this figure with respect to FIG. 1 that the arrangement of the flexible ducts 5 and 9 is different.

Figure 5:
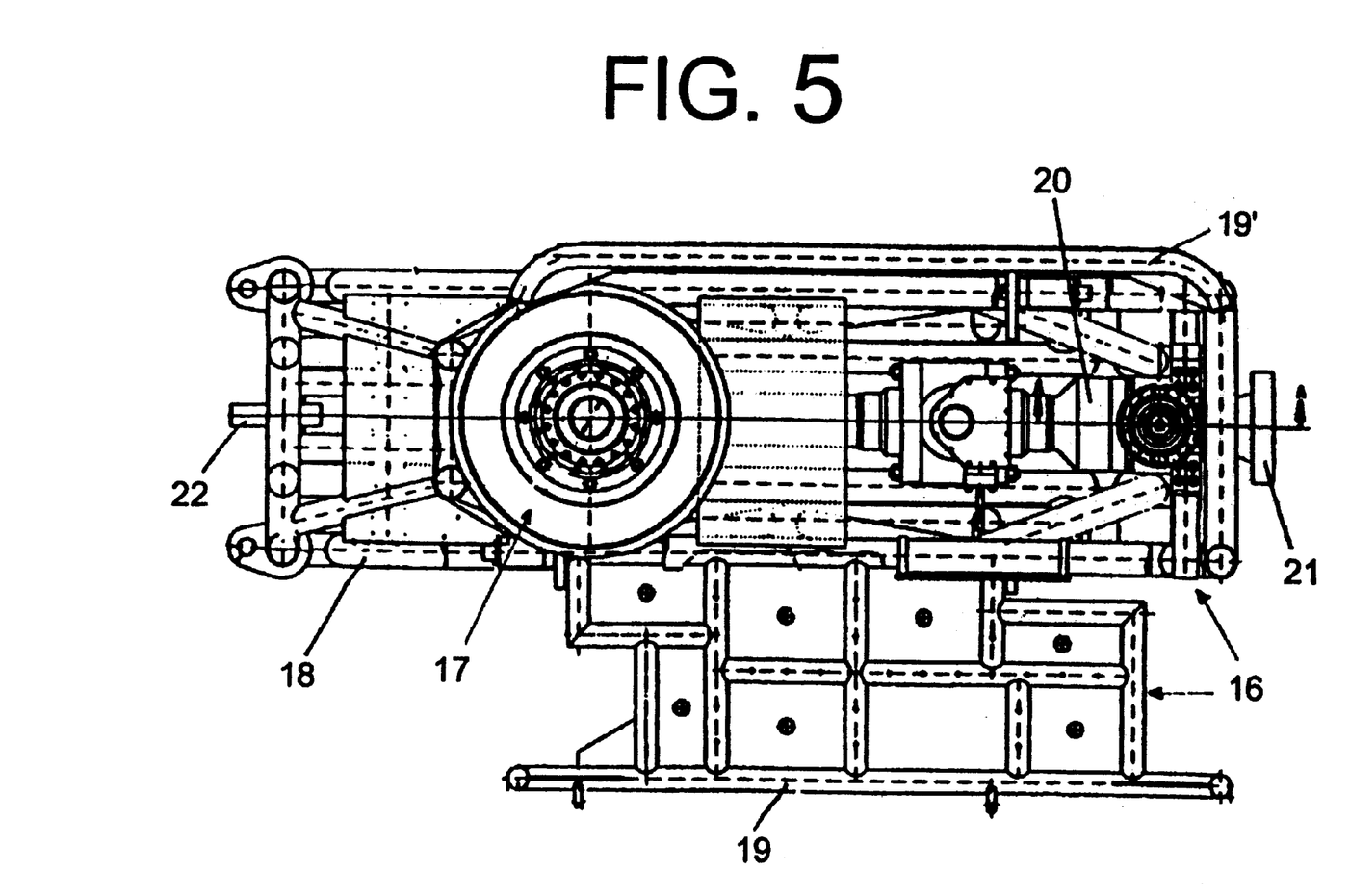
FIG. 5 is a top view of a preferred embodiment of the connection device of the invention.

FIG. 5 shows a top view of a preferred embodiment of the connection device 14, 15 of the invention, in which one can see that the base 16 is constituted by a central structure 18 and by two side structures 19, 19', which are turnable with respect to the central structure. In the figure, one can see that the side structure 19' is the turned position, while the structure 19 is open, that is, in the operation position. The side structure are maintained in the operation position by means of pistons (not shown) that are hydraulically actuated. The mobility characteristic of the side structures is especially important for carrying the connection device, since, with the side structures turned, loss space is taken in the service ship.

The central structure 18 supports the vertical hub 17, as well as a tube 20 which has a end connected to the lower part of the hub, and the other end 21 projecting outwardly of the central structure 18. The end 21 of the tube can turn when it is not energized, that is, when there is no hydraulic oil applying pressure onto it. This rotation of the end 21, during the hoisting of the connection device, as already said, compensates for the residual torsion of the rigid duct and prevents said connection device from remaining in an incorrect final position, which would render difficult the installation of the flexible duct difficult or even prevent it, as is the case with the prior art. The metal/metal joint formed between the flange of the end 21 and the flange of the rigid duct is usually called swivel.

In the central structure 18, at the end opposite to the end of the tube 21, there is an eyehole 22 designed for installing a steel rope (shown in FIGS. 11 and 12) for hoisting or launching the connection device, after the latter has been coupled to the rigid duct 8. The eyehole 22 is fixed at a point above the center of gravity of the connection device (see FIG. 7), so that, during the descent to the bottom of the sea, the device can maintain the stability, thus preventing an incorrect final positioning on the bottom of the sea.

Figure 6:
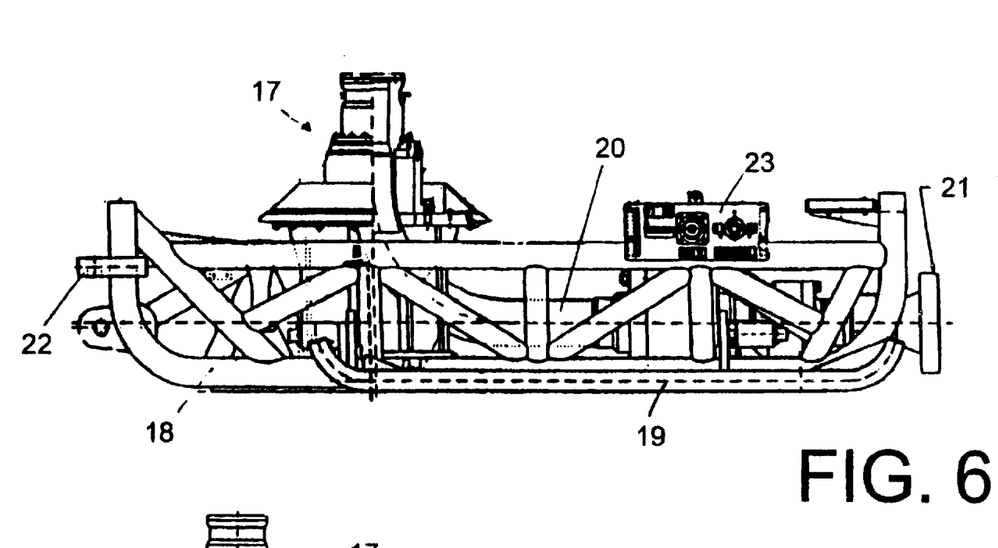
FIG. 6 is a front view of the device of FIG. 5.

FIG. 6 shows a front view of the connection device of FIG. 5, where the components indicated previously can be seen in greater detail, as well as the panel 23 which is designed for engagement of the arm of a submarine robot (ROV) for actuating valves and hydraulic commands, when determined operations are performed.

Figure 7:
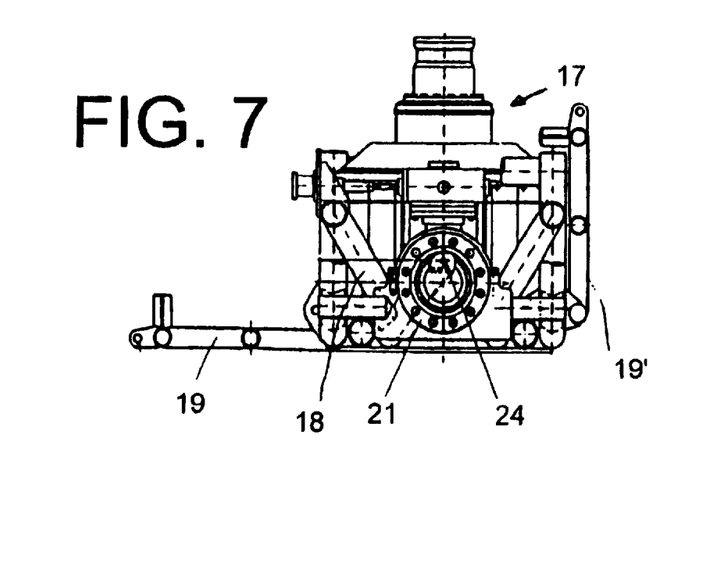
FIG. 7 is a side view of the device of FIG. 5.

FIG. 7 shows a side view of the device of FIG. 5, where one can see the center of gravity 24 of the connection device. It is clear from FIG. 6, at the side, that the eyehole 22 is above the center of gravity.

Figure 8:
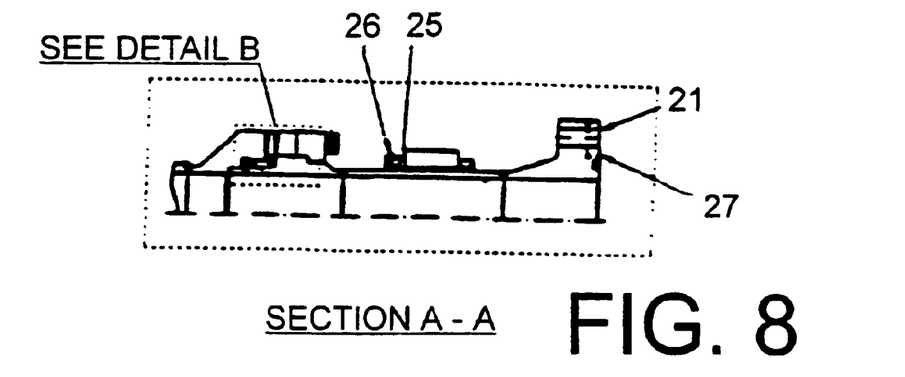
FIG. 8 is a cross-section along the line A—A in FIG. 5.
Figure 12:
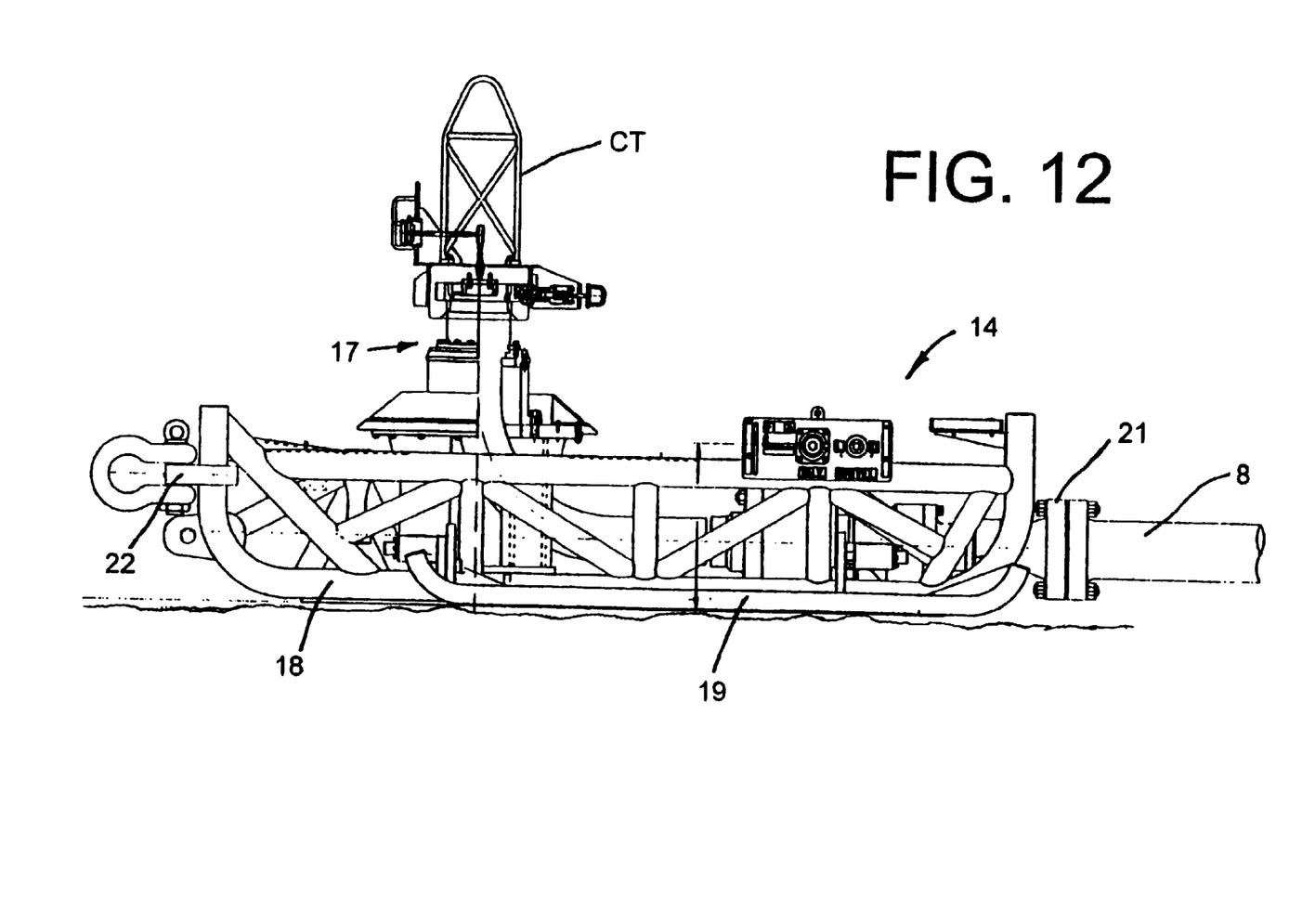
FIG. 12 is a view of the connection device of FIG. 11, already laid on the bottom of the sea.

FIG. 8 shows a cross-section A—A, indicated in FIG. 5, where one can see the assembly that energizes the end 21, maintaining it fixed, or that allows it to turn when it is desactivated. This assembly presents a bearing 25 and a bearing support 26, which enable the rotation of the end 21 when there is no hydraulic pressure applied onto it. The figure further shows the ring "O" 27, which makes water-tight the joint tormed between the flange of the end 21 and the flange of the rigid duct, as shown in FIG. 12.

Figure 9:
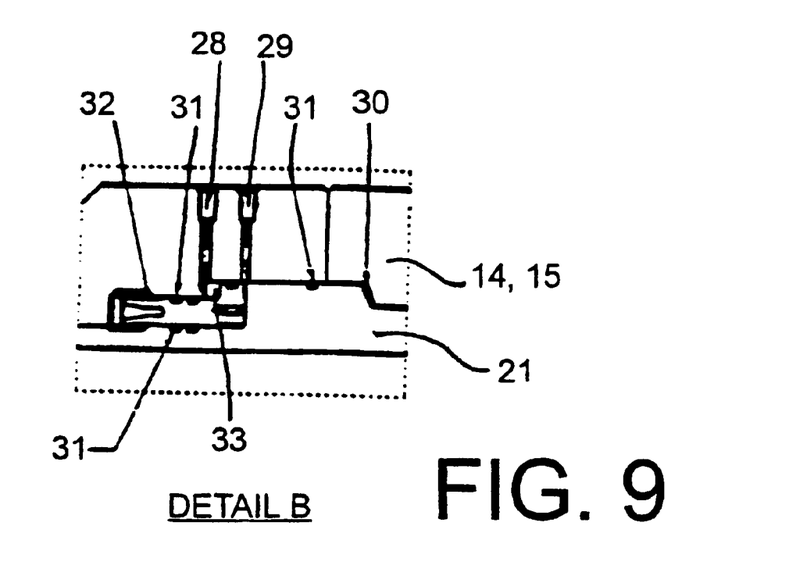
FIG. 9 is a detail B, indicated in FIG. 6.

FIG. 9 shows the detail "R" of FIG. 8, where one can see the hydraulic command tubes 28 and 29, the prop ring 30, the rings "O" 31 and the sealing ring 32. In this way, in order to keep the end of the tube 21 immovable and place the petroleum extraction system in the operation condition, the system has to be activated, that is, hydraulic oil is injected under pressure, by the tube 28, into the hydraulic oil chamber 33, which causes the sealing ring 32 to advance, and in this way its outer surface actuates against the body of the connection device 14 or 15, while its inner surface actuates against the end 21. By means of friction of the respective surfaces of the sealing ring, occurs locking of the end 21 occurs, In order to desactivate the end and allow it to turn, it is enough to release the pressure of the oil on the tube 28 and, if necessary, apply a slight pressure onto the oil of the tube 29.

Figure 10:
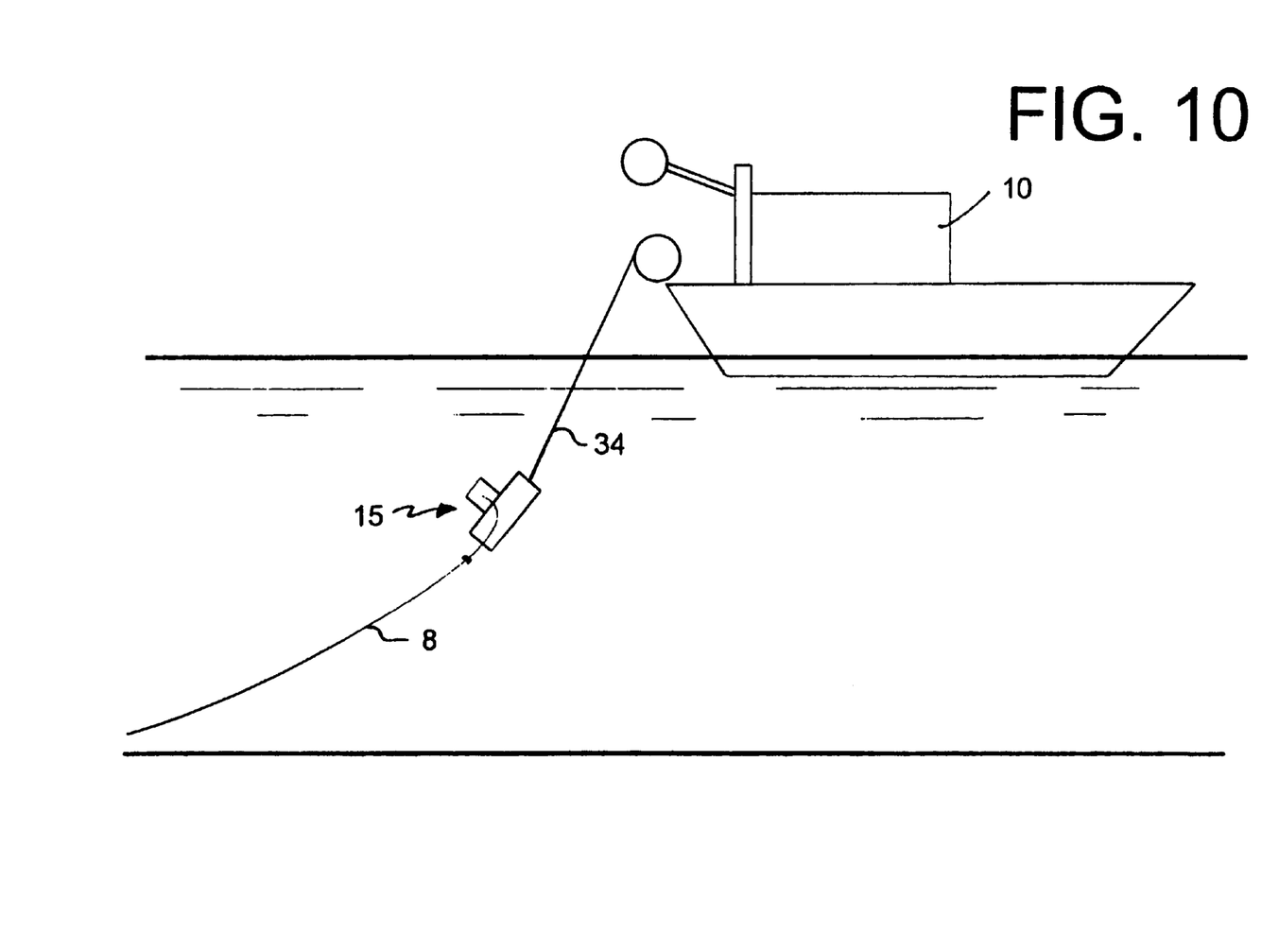
FIG. 10 is a schematic view showing the relaunching of the rigid duct, carrying at its end a connection device according to the invention.

FIG. 10 shows a schematic drawing of the launching of the rigid duct 8 and the connection device 15, by means of a steel rope 34, which is retrieved into the service ship 10 after the launching.

Figure 11:
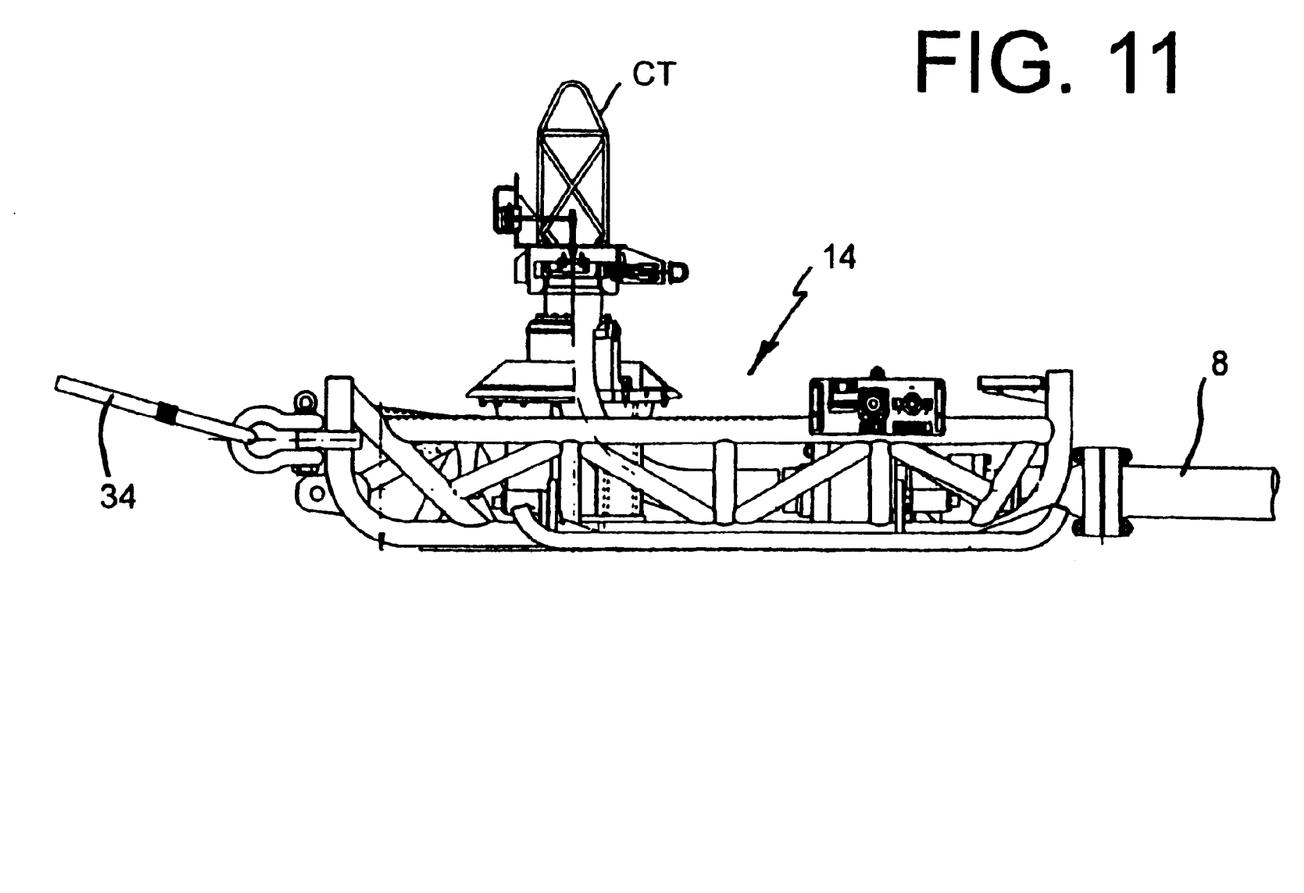
FIG. 11 is a view of the connection device of the invention coupled to the rigid duct during the descent to the bottom of the sea.

FIG. 11 shows the connection device 14 connected to the other end of the rigid duct 8, being launched to the bottom of the sea by means of a steel rope 34. In this figure, the connection device 14 is with a test cover CT, which is not part of the invention.

Finally, FIG. 12 shows the connection device 14 laid on the bottom of the sea, the steel rope having already been withdrawn. Then, the operations for coupling the flexible duct to the hub 17 are performed.

In addition to the embodiment presented above, the same inventive concept can be applied to other alternatives and possibilities of utilization of the invention. For instance, the connection device of the invention may also be used for connecting a tube to another equipment, or two equipment to each other, or for connecting two valves to each other.

Thus, it should be understood that the present invention should be interpreted in a broad way, its scope being determined by the terms of the accompanying claims.

What is claimed is:

1. A connection device for connecting tubes, comprising a base (16) with a structure; a hub fixed on the base (16) and adapted to receive an end of an external tube (5,9); a hoisting/launching device (22) and a tube (20) fixed to the structure, the tube (20) having a first end connected to the hub and a second end being free and adapted to receive an end of another external tube (8), characterized in that the second end (21) of the tube (20) is rotatable and longitudinally displaceable and the hoisting/launching device (22) is placed above the center of the cross section of said second end (21).

2. A connection device according to claim 1, characterized in that the hoisting/launching device (22) is designed as an eyehole.

3. A connection device according to claim, characterized in that the base (16) is constituted by a central structure (18) and two side structures (19, 19') one on each side of the central structure, the side structures (19, 19') being turnable.

4. A connection device according to claim 1, characterized in that the second end (21) of the tube (20) is supported by a bearing (25).

5. A connection device according to claim 1, characterized in that the second end (21) of the tube (20) is lockable by means of hydraulic oil applied under pressure through a hydraulic command tube (28).

6. A connection device according to claim 1, further comprising an adjustable seal and a pressure line in fluid communication with said adjustable seal;

said adjustable seal being adjustable between a rotation lock mode relative to the second end of the tube and a free rotation to the second end of the tube.

7. A connection device of tubes, comprising a base (16) with a structure, a hub fixed on the base (16) and adapted to receive an end of an external tube (5,9); a hoisting/launching device (22) fixed to the structure and placed above the center of gravity of the connection device; and a tube (20) fixed to the structure, the tube (20) having a first end connected to the hub and a second end being free and adapted to receive an end of another external tube (8), wherein the second end (21) of the tube (20) is rotatable and longitudinally displaceable, the hoisting/launching device (22) is placed above the center of the cross section of said second end (21) and the hub (17) is placed vertically on the base (16).

8. A connection device comprising a base (16); a hub fixed on the base; a hoisting/launching device; and a tube (20) with the first end connected to the hub and the second end being free, characterized in that the hoisting/launching device (22) is placed above the center of gravity of the connection device (14, 15) and the second end (21) of the tube (20) is movable; and said connection device being further characterized in that the base (16) is constituted by a central structure (18) and two side structures (19, 19'); one on each side of the central structure, the side structures (19, 19') being turnable.

9. A connection device as recited in claim 8 further characterized in that the base (16) is constituted by a central structure, and said hoisting/launching device is secured to an end of said central structure opposite to an end of said base structure which is adjacent the second end of said tube.

10. A connection device comprising a base (16); a hub fixed on the base; a hoisting/launching device; and a tube (20) with the first end connected to the hub and the second end being free, characterized in that the hoisting/launching device (22) is placed above the center of gravity of the connection device (14, 15) and the second end (21) of the tube (20) is movable; and said connection device being further characterized in that the end (21) of the tube (20) is supported by a bearing (25).

11. A connection device as recited in claim 10 further characterized in that the base (16) is constituted by a central structure, and said hoisting/launching device is secured to an end of said central structure opposite to an end of said base structure which is adjacent the second end of said tube.

12. A connection device comprising a base (16); a hub fixed on the base; a hoisting/launching device; and a tube (20) with the first end connected to the hub and the second end being free, characterized in that the hoisting/launching device (22) is placed above the center of gravity of the connection device (14, 15) and the second end (21) of the tube (20) is movable;

characterized in that the movable end (21) of the tube (20) is lockable by means of hydraulic oil applied under pressure through a hydraulic command tube (28).

13. A connection device as recited in claim 12 further characterized in that the base (16) is constituted by a central structure, and said hoisting/launching device is secured to an end of said central structure opposite to an end of said base structure which is adjacent the second end of said tube.

* * * * *